United States Patent [19]

Grabiec et al.

[11] Patent Number: 6,006,271

[45] Date of Patent: Dec. 21, 1999

[54] METHOD AND PROTOCOL FOR COMPLETE COLLISION AVOIDANCE CONTENTION RESOLUTION IN LOCAL AREA NETWORKS

[75] Inventors: Jacek Grabiec, Chicago; David Grabelsky, Skokie; Mike Borella, Naperville; Ikhlaq Sidhu, Vernon Hills, all of Ill.

[73] Assignee: 3Com Corporation, Santa Clara, Calif.

[21] Appl. No.: 09/032,125

[22] Filed: Feb. 27, 1998

[51] Int. Cl.$^6$ ........................................ G06F 13/00
[52] U.S. Cl. ............................. 709/235; 370/229
[58] Field of Search ..................... 709/200, 201, 709/220, 221, 222, 223, 224, 225, 228, 229, 235; 370/229, 230, 231, 232, 233, 234

[56] References Cited

U.S. PATENT DOCUMENTS

| | | | |
|---|---|---|---|
| 4,574,378 | 3/1986 | Kobayashi | 370/348 |
| 5,583,872 | 12/1996 | Albrecht et al. | 370/476 |
| 5,657,326 | 8/1997 | Burns et al. | 370/349 |

*Primary Examiner*—Moustafa M. Meky
*Attorney, Agent, or Firm*—McDonnell Boehnen Hulbert & Berghoff

[57] ABSTRACT

A complete collision avoidance contention resolution protocol is provided for networks with stations communicating over a shared access communication medium. The protocol is used where a physical layer connected to the communication medium uses a carrier modulation scheme with multiple frequencies. Stations on the network that desire access to the communication medium use a carrier modulation scheme with multiple frequencies. Stations that desire access simultaneously transmit a single frequency selected at random from a set of physical layer frequencies during an open-contention-interval. At the same time, the stations listen to a combined frequency signal and analyzes it for frequency content. If one station whose own frequency matches the highest frequency signal in the combined signal, the station gains access to a communication medium. If more than one station have the same highest frequency signal in the combined signal, no station gains access to the medium. The stations with the highest frequency signal initiate a restricted-contention-interval. The probability of successful contention resolution increases very rapidly using the restricted-contention-interval. When only one station has the highest frequency signal, it gains access to the medium. By resolving contention prior to providing access to any station, collisions of data are completely eliminated. By partitioning the set of frequencies in contiguous ranges, multiple priority classes can be used with the contention resolution method.

30 Claims, 8 Drawing Sheets

METHOD AND PROTOCOL FOR COMPLETE COLLISION AVOIDANCE CONTENTION RESOLUTION IN LOCAL AREA NETWORKS

FIELD OF INVENTION

The present invention relates to communications in computer networks. More specifically, it relates to a method and protocol for resolving contention between stations in computer networks.

BACKGROUND OF THE INVENTION

Local Area Networks ("LAN") may operate using different topologies and protocols for providing stations on the LAN with access to communications facilities for communicating with one another and for sharing resources. In several widely used topologies, stations share a communication medium over which stations transmit data to one or more stations. Successful transmission of data by a station typically requires exclusive access to the medium. When more than one station has data to transmit at the same time, protocols may provide resources for resolving conflicts among the contending stations.

Various protocols for resolving contention among stations having data to transmit on the communications medium may be used. One widely used scheme is the Carrier Sense Multiple Access with Collision Detection ("CSMA/CD") protocol. The CSMA/CD is organized around layered protocols according to the Open Systems Interconnection ("OSI") reference model. The OSI model consists of seven layers including, from lowest-to-highest, a physical, data link, network, transport, session, application and presentation layer. The physical layer transmits bits over a communication link. The data link layer establishes and maintains point-to-point connections for the transmission of data frames.

The CSMA/CD protocol includes a data link layer with a Logical Link Control ("LLC") sub-layer and a Medium Access Control ("MAC") sub-layer. The LLC sub-layer handles logical links between stations while the MAC controls access to a communication medium via a physical layer. A CSMA/CD standard for Ethernet LANs is defined by Institute of Electrical and Electronic Engineers ("IEEE") 802.3 standard.

The CSMA/CD structure is a peer-to-peer network structure and stations on the network are vying for use of a channel when they have data to transmit. The contention can result in collisions that distort the transmission signals. Stations on the network cannot use distorted collision signals. A "collision window" is typically used to handle CSMA/CD collisions. A collision window describes the length of time required for a signal to propagate through the channel and to be detected by each station in the network.

Token bus LANs use a bus topology and provide access to a channel as if it were a ring. The token bus protocol is a collision-free protocol that uses a special frame called a "token" to govern which network station is allowed to send data. Capacity can be allocated through the use of priority classes. IEEE 802.4 defines a token bus LAN standard.

Token ring LANs connect participating stations in a ring topology; each station is connected to the medium via a ring interface unit. The ring interface unit is responsible for monitoring data passing through it as well as regenerating a signal and passing it to the next station. Token ring LANs use a token to determine which station may transmit, and also include a priority scheme. The object of the priority scheme is to give each station an opportunity to reserve the use of the ring for the next transmission around the ring. IEEE 802.5 defines a token ring LAN standard.

The CSMA/CD work reasonably well with large numbers of stations, but do not easily or efficiently support multiple priority classes or priority schemes. Also, their throughput performance suffers significantly in the presence of a high volume of network traffic. Token bus and token ring protocols with LLC and MAC can sustain relatively constant throughput even if the network traffic grows but they are typically more complex than CSMA/CD protocols.

In addition, contention resolution schemes that permit data collision in controlling access to the communication medium may operate adequately in small networks. In larger networks that have a higher number of stations, however, the overall throughput of the system degrades. This is because the probability of collision increases in systems in which the number of stations contending for access increases. One substantial component of the conflict resolution time is the time required to begin the transmission of data and to detect collisions. As the number of collisions increases, the time required to resolve the conflicts increases resulting in the degradation of the system throughput.

It is desirable, especially in the area of real-time services (e.g., teleconferencing), to have a contention resolution protocol which is simple, efficient, fair and distributed that can be used on a variety of computer network topologies (e.g., star, inverted tree, bus). The protocol should allow for a large number of network stations with differing priority class levels and delay requirements.

It is further desirable to provide a contention resolution scheme for networked stations to contend for resolution without the need to detect collisions.

SUMMARY OF THE INVENTION

It is an object of the present invention to address the problem of inefficient contention resolution due to the time required to sense and resolve contention after the occurrence of collisions in the communications medium. In particular, it is an object of the present invention to increase throughput in networks having any number of stations by completely avoiding collisions during contention resolution.

In view of the above, a system is provided for resolving contention for access to a shared communication medium in a computer network of a plurality of stations. The system comprises a contention signal transmitter in each station for broadcasting an intent-to-transmit signal of a randomly selected frequency. The intent-to-transmit signal from each station having data to transmit combines to create a combined contention signal. A contention signal analyzer is included for decoding the combined contention signal. The contention signal analyzer determines which stations broadcast the intent-to-transmit signals with the highest frequency.

A medium access controller is included in at least one station to grant access to the communications medium or to force a restricted contention step. The medium access controller enables the station with the only highest frequency intent-to-transmit signal to transmit data on the communications medium, and to initiate a restricted contention for access between the stations having intent-to-transmit signals with the same frequency.

In another aspect of the invention, a method is described for resolving contention by completely avoiding collision in a network of a plurality of stations contending for access to a shared communications medium. According to the described method, each station having data to transmit broadcasts a first signal on the communications medium. The first signal of each station has an access parameter. Each station receives a second signal that is a combination of the first signals of the stations on the network having data to transmit. Each station analyzes the second signal to determine whether the access parameter of the first signal it broadcast is the only highest or one of the highest access parameters. When the station determines that the access parameter of the signal it broadcast is the only highest, it begins to transmit data on the communications medium. The method is repeated until the station broadcasts the only highest parameter access parameter.

In another aspect of the present invention, a computer readable storage system has stored therein a set of routines for implementing a medium access control protocol for contention resolution. The set of routines is capable of distinguishing among a plurality of priority classes for a plurality of stations connected to a computer network. The routines implementing the protocol include a set of intervals and signals that include an open contention interval, and intent-to-transmit signal, a combined contention signal, a restricted contention interval and a restricted contention interval delay. The open contention interval is initiated by a dead-time-silence interval and is used to allow the plurality of stations to contend for access to a communications medium. The intent-to-transmit signal has an access parameter. The combined contention signal which includes a combination of the intent-to-transmit signals is used by each station to resolve contentions such that one of the plurality of stations transmits data on the communications medium when it transmits the only highest priority intent-to-transmit signal. The restricted contention interval is used for resolving contention only between a plurality of stations having the highest access parameter. The restricted contention interval is initiated by a restricted contention interval delay.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

A presently preferred embodiment of the present invention is described below with reference to the attached drawings. One of ordinary skill in the art will understand that the network system in which the present invention is described below is but one example of a network in which the present invention may be used.

Figure 1A:
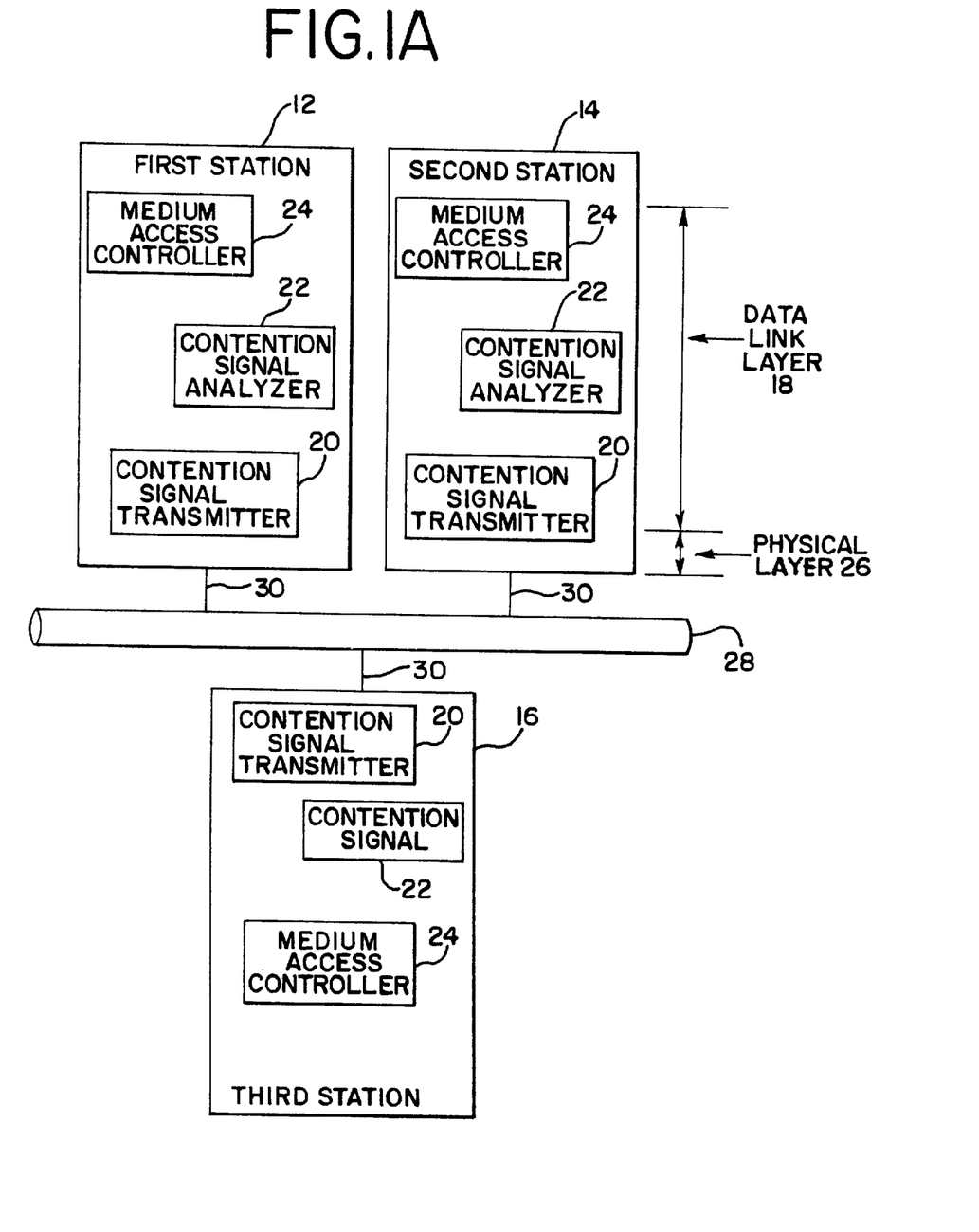
FIG. 1A and 1B are block diagrams of examples of network systems in which illustrative embodiments of the present invention find particular use.

FIG. 1A is a block diagram of a network system 10 used to implement an illustrative embodiment of the present invention. Network system 10 is illustrated as a wired bus LAN but may also include other types of networks (e.g., wireless, tree topology). As is known in the art, the Open System Interconnection ("OSI") model is used to describe computer networks. The OSI model consists of seven layers including from lowest-to-highest, a physical, data link, network, transport, session, application and presentation layer. The physical layer transmits data over a communication link. The data link layer establishes and maintains point-to-point communications for the transmission of data frames. Not all networks include each layer in the OSI model. In addition, it is readily apparent to one of ordinary skill in the art that reference is made herein to the OSI model for illustrative purposes. Embodiments of the present invention may be used in networks whether reference is made to the OSI model or not.

The network system 10 in FIG. 1A includes multiple network stations 12, 14 and 16. Only three network stations are illustrated in FIG. 1. However, the invention is not limited to a network with three network stations and more or fewer network stations can also be used. Network stations (12,14,16) have a data link layer 18 and other higher layers (e.g., network layer, etc.) not shown in FIG. 1. The other layers (hereinafter referred to as "application") perform functions that may require data transmission to other stations. A physical layer 26 is included below data link layer 18. The physical layer 26 of each station 12, 14, 16 is connected to a communication medium 28 with a connector 30.

The network system 10 may include any system that uses a contention resolution scheme prior to transmitting data. Examples of such networks may be found in Grabelsky et al. U.S. patent application Ser. No. 09/003,844 "METHOD AND PROTOCOL FOR A MEDIUM ACCESS CONTROL LAYER FOR LOCAL AREA NETWORKS WITH MULTIPLE-PRIORITY TRAFFIC" (filed Jan. 7, 1998, and assigned to the assignee of the present invention), and still pending, which is incorporated by reference herein.

In the network 10 in FIG. 1A, contention resolution is carried out in each station 12, 14, 16 using hardware and software subsystems which include a contention signal transmitter 20, a contention signal analyzer 22 and a medium access controller 24. The contention signal transmitter 20 broadcasts the intent of the station to transmit data by transmitting a first signal having an access parameter. The access parameter permits the system to compare or measure any given station's right to access the medium in relation the other stations. In a preferred embodiment described below, the first signal is a tone, or a sinusoidal signal, having a randomly selected frequency. The randomly selected frequency level is the access parameter of the station at any given time. Each station can compare the frequency of the first signal it transmitted with that of the other stations. The station that selected the only highest frequency accesses the medium.

The first sign is compared by the stations having data to transmit after all of the first signals combine to form a second signal. As described below, the frequencies of the first signals of each station having data to transmit combine by superposition to form the second signal. The second signal is analyzed (e.g. by using Fast Fourier Transforms) in each station that transmitted the first signal in the contention signal analyzer 22. The medium access controller 24 in each station that transmitted the first signal determines whether the station 12, 14 or 16 has access to the communications medium 28. The station 12, 14 or 16 will access the medium 28 only if it transmitted the only highest access parameter first signal.

The medium access controller 24 may control time periods during which each station may transmit the first signal and analyze the second signal. In addition, the medium access controller 24 may initiate a restricted contention interval in case more than one station has the same highest access parameter first signal. The medium access controller 24 may also provide synchronization functions that ensure that all stations are contending at the same time and to ensure that only selected stations contend during the restricted contention interval. Synchronization functions may be carried by simply waiting for silence for a predetermined time interval, or by transmitting handshaking signals.

The stations 12, 14, 16 in the network system 10 in FIG. 1A comprise a peer-to-peer network system. The stations 12, 14, 16 are peers in that each station contends for access to the communications medium 28 independently of one another. Each station 12, 14, 16 determines whether it has gained access to the medium by performing the contention resolution method disclosed in the Grabelsky et al. application or the complete collision avoidance contention resolution method summarized above and described below with reference to FIGS. 3A and 3B.

An alternative network system 11 is illustrated in FIG. I B. The network system 11 in FIG. 1B includes peer network stations 13, 15 and an access control station 17. Two peer network stations 13, 15 are illustrated, however, any number of stations may be used in the network. The stations 13, 15 are identified by an address 23 so that the access control station 17 may address messages to selected peer stations 13 or 17. In the network system 11 in FIG. 1B, the access control station 17 includes a contention signal analyzer 22' and a medium access controller 24' for determining which station will gain access to the medium out of those simultaneously requesting access.

The peer stations 13, 15 broadcast a first signal as notice to the other stations of an intent to transmit data as described above with reference to FIG. 1B. The peer stations 13, 15 use the contention signal transmitter 20' and then they wait until an open contention interval is initiated as described above. The first signals of each station combine to form the second signal. The access control station 24' uses the medium access controller 24' and the signal analyzer 22' to perform the analysis of the second signal. When the access control station 24' has determined that only one station has access to the medium, it sends a control signal indicating that only that station may transmit on the medium. The control signal may take the form of a grant message GR to that station. If the access control station 17 determines that more than one station have equal access, the access control station 17 sends a contend message only to the stations having equal access. The stations begin a restricted contention process in response to the contend message CO.

Figure 1B:
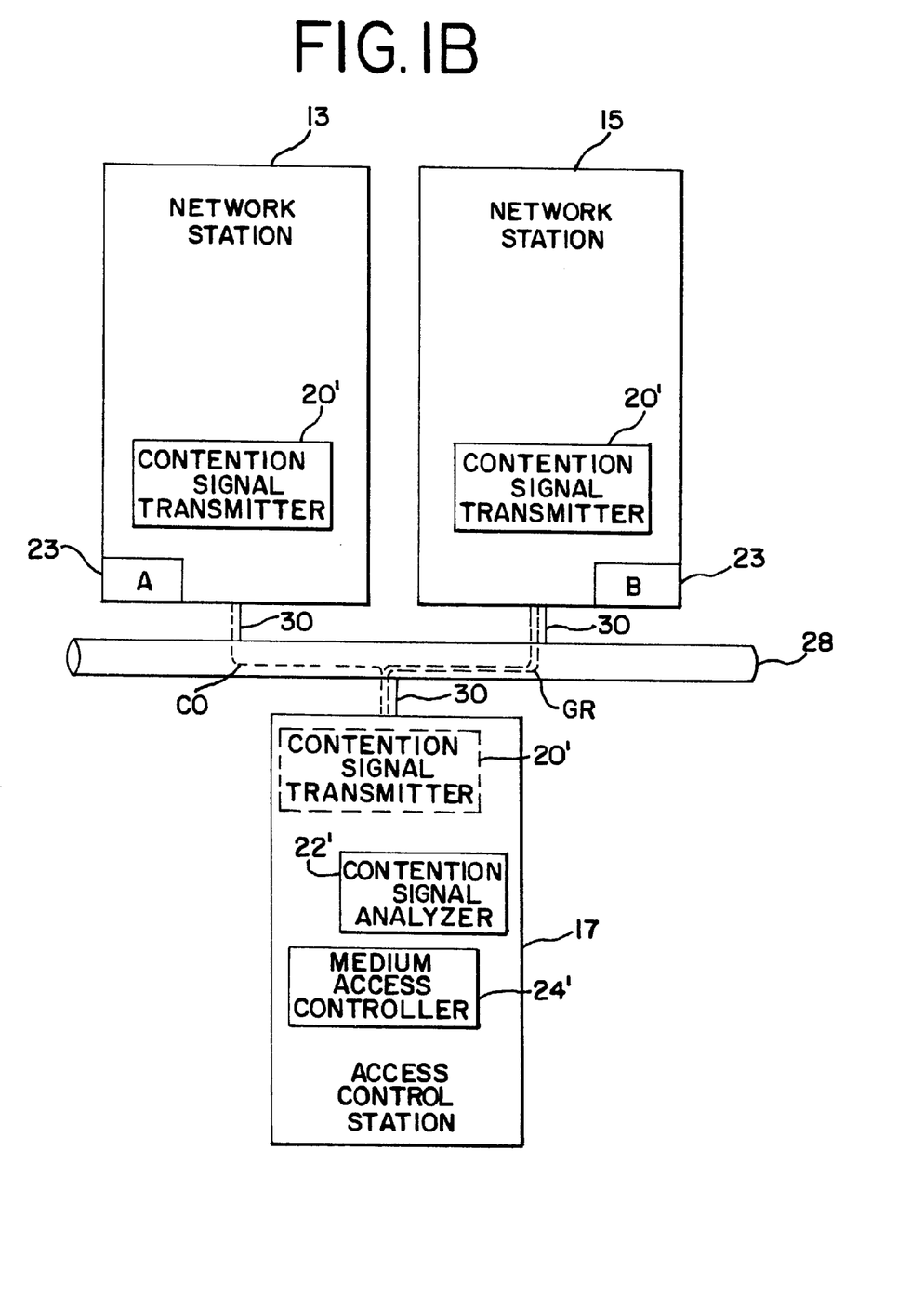

Alternatively, the control signal may take the form of a re-transmission by the control station 17 of the highest frequency first signal broadcast by the stations having data to transmit. The transmission of the control signal may be preceded by silence for a restricted contention delay of time period shorter than the open contention interval to indicate that more than one station broadcast at that frequency. If only one station broadcast the only highest frequency first signal, the control station will re-transmit the tone immediately.

Optionally, access control station 17 may contend for access as a peer using the contention signal transmitter 20'.

With respect to the systems illustrated in FIGS. 1A and 1B, an operating environment for the network stations of the present invention includes a processing system with at least one high speed Central Processing Unit (CPU). In accordance with the practices of persons skilled in the art of computer programming, the present invention is described below with reference to acts and symbolic representations of operations that are performed by the processing system, unless indicated otherwise. Such acts and operations are referred to as being computer-executed.

It will be appreciated that the acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPUs operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, and any other volatile or non-volatile mass storage system readable by the computer. The computer readable medium includes cooperating or interconnected computer readable medium, which exist exclusively on the processing system or be distributed among multiple interconnected processing systems that may be local or remote to the processing system.

The stations may be any type of computer or device that communicates data with other stations over the communications medium 28.

MAC layer protocol contention resolution

Figure 2:
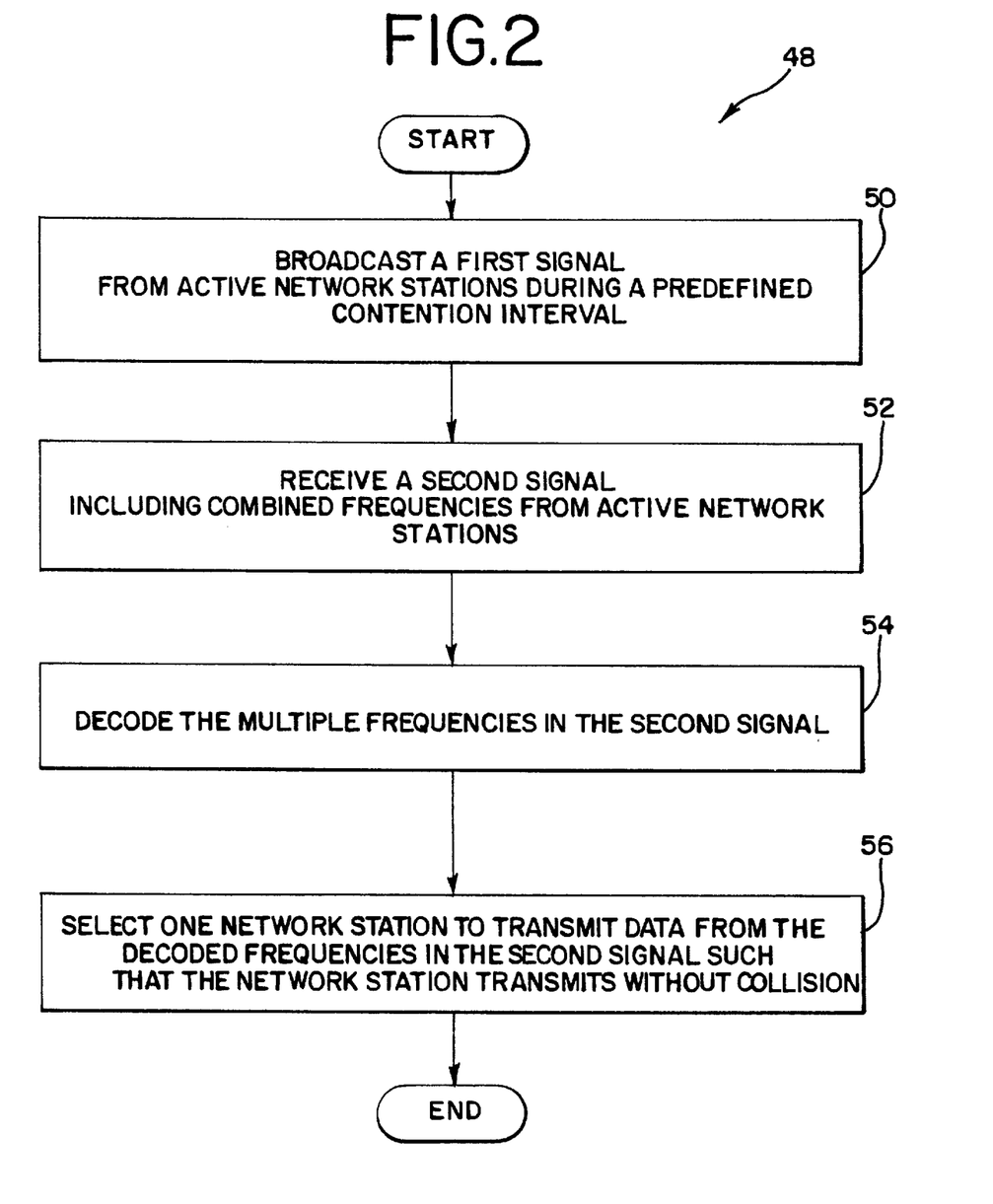
FIG. 2 is a flow diagram illustrating a method of complete collision avoidance contention resolution.

FIG. 2 is a flow diagram illustrating a method 48 for resolving contentions. The method includes broadcasting a first signal, referred to as an intent-to-transmit signal in network system 10, from active stations desiring to transmit data during a predefined contention interval at step 50. The first signal frequency is a single signal frequency selected at random from a predetermined set of frequencies used by a physical layer in the network. Each station participating in the protocol makes its frequency selection independently of all other stations. A second signal is received on the network stations at step 52. The second signal is a simultaneous superposition of the signals broadcast by the active stations on the network during the contention interval. The second signal is decoded and the frequencies present are determined at step 54. At step 56 a station determines based on the decoded frequencies and a comparison of the decoded frequencies with the frequency transmitted in the first signal if the station can transmit data. If a station has determined it can transmit data, the station is allowed to transmit data until its transmission is complete without interference from any of the other network stations.

Complete Collision Avoidance Content Resolution

The network systems in FIGS. 1A & 1B may perform contention resolution using a wide variety of methods. The collision detecting method for contention resolution disclosed in Grabelsky et al. is an example of such methods.

Figure 3A:
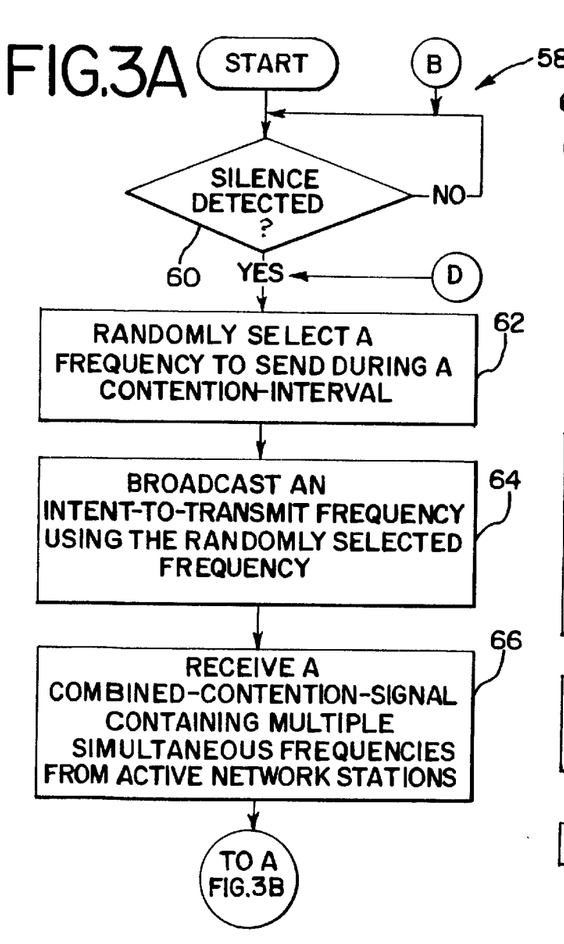
FIGS. 3A and 3B are flow diagrams illustrating a method for complete collision avoidance contention resolution using the network in FIG. 1A.
Figure 3B:
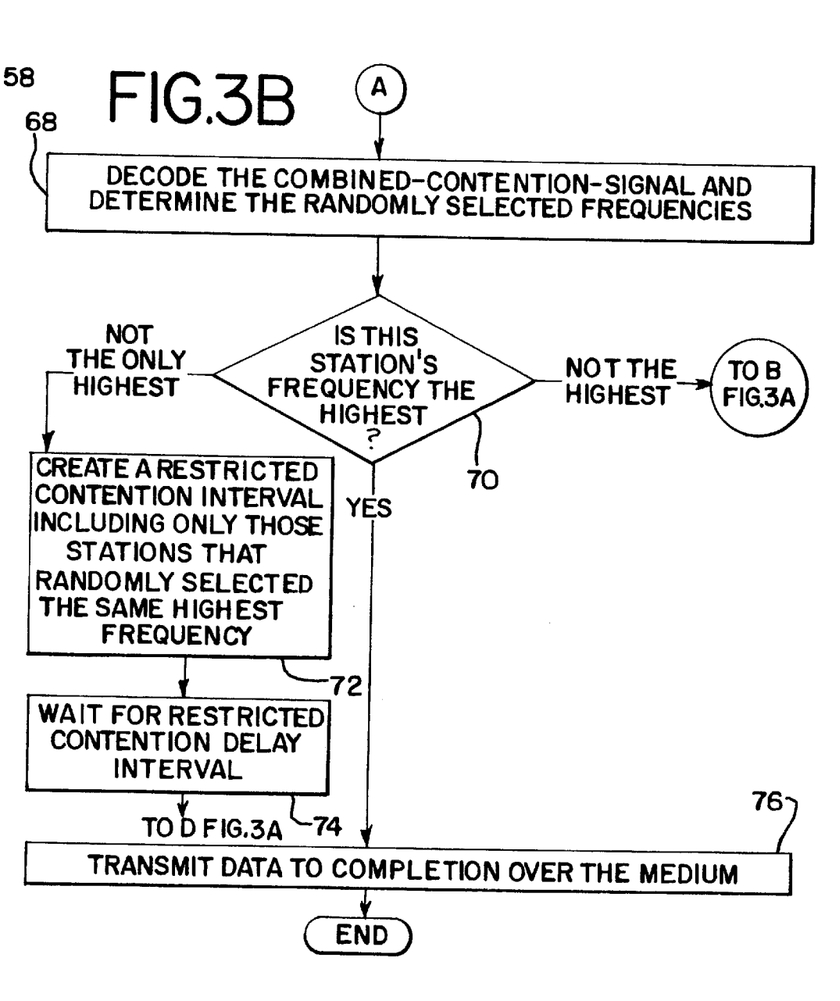

FIGS. 3A and 3B are a flow diagram illustrating a complete collision avoidance method 58 for contention resolution. The collision avoidance method 58 completely resolves contentions prior to the transmission of data by any station. If the intent-to-transmit signals of more than one station have the highest frequency, no station transmits data. The contention resolution process continues until only one station has the highest frequency intent-to-transmit signal. Because only the station having the only highest frequency intent to transmit signal transmits data, the possibility of data collisions is completely eliminated. The elimination of collisions during contention resolution advantageously increases the overall throughput of the system.

Referring to FIG. 3A, when a station desires to transmit data it has received from the application, it first monitors the communication medium 28 for a period of silence of a duration equal to, or greater than a dead-time-silence interval. The dead-time-silence-interval is a predetermined time period that initiates an open contention interval. A test is conducted for silence at step 60 in FIG. 3A. Silence could be detected immediately if no transmission is in progress. If a transmission is already in-progress, the station waits until the transmission is complete. In either case, if silence is detected for dead-time-silence-interval (e.g., 0.5 milliseconds), the open-contention-interval begins.

During the open-contention-interval, stations that desire to transmit data and have detected silence for at least one dead-time-silence-interval set an access parameter for an intent-to-transmit signal. The access parameter is a characteristic of the intent-to-transmit signal that enables each station to determine which station on the network will obtain access to the communication medium 28 during any given contention interval. The priority level need not reflect a functional priority among the stations on the network. For example, the priority level may be set by selecting a frequency at random from a predetermined set of frequencies for physical layer 26 at step 62. If desired, a functional priority selection among stations on the network may be achieved using the multiple priority classes described below with reference to FIG. 5. The frequency is a single signal frequency selected at random from a fixed set of available frequencies and each station makes its selection independently of all other stations. In addition, as explained below, a station will randomly select a different frequency if it is involved in a restricted contention interval.

Each contending station (12,14,16) makes an independent frequency selection. However, two or more stations may, by chance, randomly choose the same signal frequency. In the collision detecting method in Grabelsky et al., choosing the same highest signal frequency would result in a later collision.

Returning to FIG. 3A, the stations broadcast intent-to-transmit signal with their selected frequencies at step 64. The stations broadcast a signal (i.e., a tone) at its chosen frequency for the duration of open-contention-interval. At step 66, each station receives a combined-contention-signal. The combined-contention-signal is a simultaneous superposition of all the signals broadcast by the stations, and is detected by each station during the same time interval in which each station broadcasts its intent-to-transmit signal.

At step 68 in FIG. 3B, combined-contention-signal is decoded in the network stations. In an illustrative embodiment of the present invention, decoding is accomplished by applying a Fast Fourier Transform ("FFT") to combined-contention-signal, then determining whether power measured in frequency bins of a resultant time-to-frequency transformed frequency signal exceeds some predetermined threshold. However, the present invention is not limited to FFTs and other decoding techniques could also be used. For more information on FFTs, see "Numerical Recipes in C: The Art Of Scientific Computing," by William H. Press, Saul A. Teukolsky, William T. Vetterling, Cambridge University Press, Cambridge, Mass., 1993.

At step 70, each station conducts a test to determine if the station's frequency signal is the only highest frequency signal, if it is one of the highest frequency signals in the combined-contention-signal, or if it is not the highest frequency signal in the combined-contention-signal. If one of the stations has an intent-to-transmit signal with a frequency that is higher than any other station, the station with the highest frequency signal immediately begins to transmit data on communication medium 28, at step 76. Because the station was determined to have the only highest frequency intent-to-transmit signal, it will be the only station that is granted access to the communication medium 28. Therefore, it will transmit data without colliding with the data transmission of another station. All other stations are prohibited from transmitting data and go back to wait again for a dead-time-silence-interval at step 60 in FIG. 3A. The stations that do not have the highest frequency may not contend again until the start of the next open-contention-interval.

If, at step 70, the same highest frequency signal in combined-contention-signal has been selected by two or more stations, no station will begin to transmit data on communication medium 28. The two or more stations that selected the same highest frequency start a restricted contention interval at step 72. Only the two or more stations having the same highest frequency are permitted to contend for access to the medium 28. The stations that do not have the highest frequency may not contend again until the start of the next open-contention-interval. All other stations are prohibited from transmitting data and go back to wait again for a dead-time-silence-interval at step 60 in FIG. 3A.

The two or more stations that will participate in the restricted-contention-interval wait for one restricted-contention-delay-interval from the start of the restricted-contention-interval. The restricted-contention-delay-interval is measurably shorter than dead-time-silence-interval (e.g., <0.5 milliseconds). This ensures that silence on medium 28 preceding a restricted-contention-interval at step 72 cannot be confused with the silence that precedes an open-contention-interval at step 60. Only the stations that have selected the same highest frequency during the open-contention-interval participate in the restricted-contention-interval. Steps 62–74 are repeated until only one station selects a highest frequency signal and the contention is resolved. Once contention is resolved, undisturbed data transmission is guaranteed without any collisions.

The complete collision avoidance method 58 provides higher overall throughput than the collision sense method disclosed in Grabelsky et al., particularly as the number of stations on the network is increased. Because the potential for collision is detected before any collision occurs, no time is spent in attempting to transmit and detecting a collision. The time saved increases for larger networks because the likelihood that stations will collide increases when the number of stations increases. In addition, the complete avoidance of collisions eliminates the need for collision detection circuitry that would otherwise be needed in a collision detecting method. The cost of the system is therefore reduced and the design of the stations is simplified.

One advantage of the complete collision avoidance method 58 described is that stations that do not have the only highest frequency intent-to-transmit signal will not attempt to transmit data. Stations using the method 58 for contention resolution may therefore operate in the same network as stations that use the collision sensing method in Grabelsky et al.

Complete Collision Avoidance Contention Resolution Using Access Control Station

The method 58 in FIGS. 3A and 3B may be carried out in a system such as FIG. 1A wherein the stations that communicate data over the communications medium comprise all of the components needed to perform contention resolution. In alternative embodiment, such as the system shown in FIG. 1B, one or more access control station 17 may control the access of the other stations to the medium.

Figure 4A:
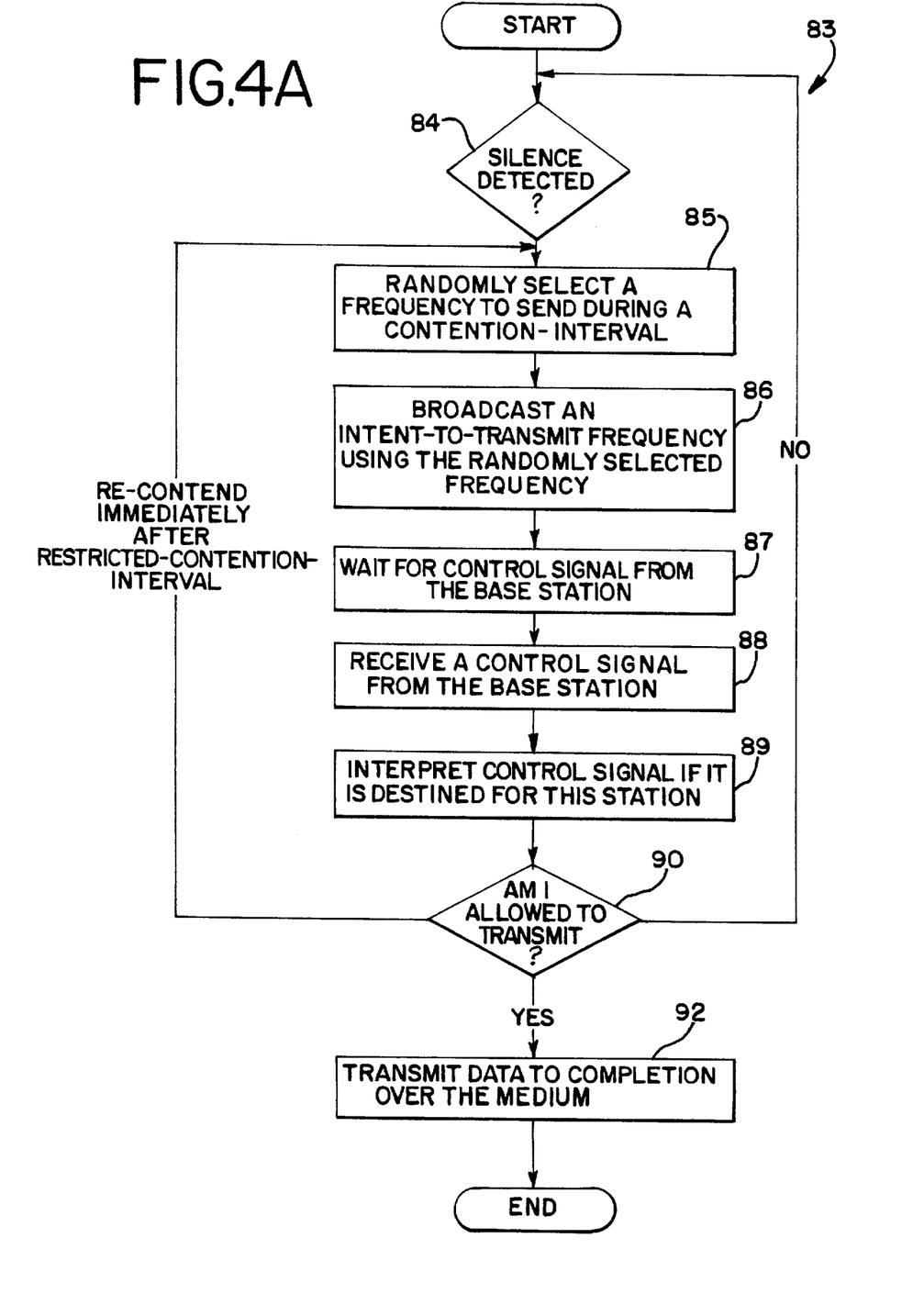
FIG. 4A & 4B are flow diagrams illustrating a method for complete collision avoidance contention resolution using the network in FIG. 1B.
Figure 4B:
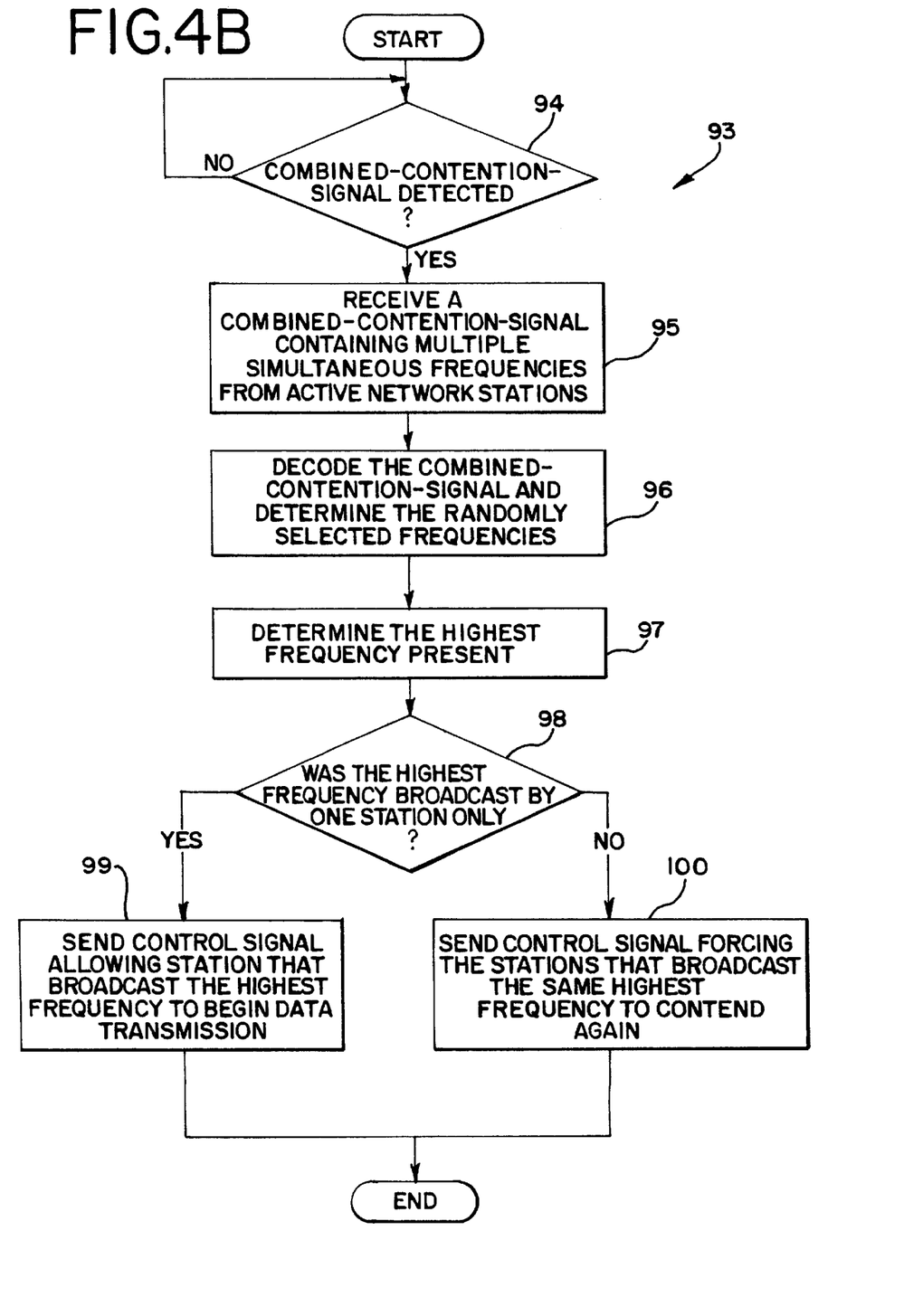

FIGS. 4A and 4B are block diagrams of an alternative complete collision avoidance contention resolution method. The alternative method includes an access request method 83 and an access control method 93. The peer stations 13, 15 should perform the access request method 83 in FIG. 4A and the access control station 17 should perform the access control method 93 in FIG. 4B. One of ordinary skill in the art can appreciate that different functions in each method may be distributed to peer stations or to the access control station where appropriate in specific embodiments.

Referring to FIG. 4A, when a peer station desires to transmit data it has received from the application, it first monitors the communication medium 28 for a period of silence of a duration equal to, or greater than a dead-time-silence interval. The dead-time-silence-interval is a predetermined time period that initiates an open contention interval. A test is conducted for silence at step 84 in FIG. 4A. Silence could be detected immediately if no transmission is in progress. If a transmission is already in-progress, the station waits until the transmission is complete. In either case, if silence is detected for dead-time-silence-interval (e.g., 0.5 milliseconds), the open-contention-interval begins.

During the open-contention-interval, stations that desire to transmit data and have detected silence for at least one dead-time-silence-interval set an access parameter for an intent-to-transmit signal. The access parameter is a characteristic of the intent-to-transmit signal that enables each station to determine which station on the network will obtain access to the communication medium 28 during any given contention interval. The parameter need not reflect a functional priority among the stations on the network. For example, the access parameter may be set by selecting a frequency at random from a predetermined set of frequencies for physical layer 26 at step 85. If desired, a functional priority selection among stations on the network may be achieved using the multiple priority classes described below with reference to FIG. 5. The frequency is a single signal frequency selected at random from a fixed set of available frequencies and each station makes its selection independently of all other stations.

Returning to FIG. 4A, the stations broadcast intent-to-transmit signal with the selected frequencies at step 86. The signals of the stations seeking access to the medium combine to form a combined-contention-signal. The combined-contention-signal is a simultaneous superposition of all the signals broadcast by the stations. The combined contention signal is detected by the access control station 17. The access control station 17 analyzes the combined contention signal as shown in method 93. The stations 13, 15 that seek access wait for a control signal from the control station at step 87. The stations 13, 15 interpret the control signal from the access control station 17. At step 90, each station 13, 15 decides whether it is allowed to transmit. If the control signal indicates that one of the stations is allowed to transmit, it will transmit data at step 92. The control signal from the access control station 17 may signal two or more stations to re-contend for access immediately after a restricted contention interval if the access control station 17 determines that more than one station broadcast the same highest frequency intent to transmit signal. If the station is not allowed to transmit, it will go back to wait for another open contention interval.

At step 94 in FIG. 4B, the access control station waits for a combined contention signal. The combined contention signal is received at step 95. The combined-contention-signal is decoded at step 96 by applying a Fast Fourier Transform ("FFT") as discussed above with reference to FIG. 3B. The access control station 17 determines the highest frequency present in the combined contention signal at step 97.

At step 98, the access control station 17 conducts a test to determine if the highest frequency signal was broadcast by only one station. If the highest frequency signal was broadcast by only one station, the access control station 17 sends a control signal indicating the station that is allowed to transmit data at step 99. If more than one station broadcast the same highest frequency signal, the access control station 17 sends a control signal that forces those stations to re-contend for access at step 100.

The control signals transmitted by the access control station 17 at steps 99 and 100 may be implemented using messages directed at the stations targeted by each signal. In step 99 the message would be sent to the station that has been allowed to transmit. In step 100, the message would be a contend message addressed only to those stations that broadcast the same highest frequency. Alternatively, the control signals may include tones that are understood by the stations to grant access to re-contend or to transmit data. This may be accomplished by transmitting only a tone matching the frequency of the tone of the station or stations that had the only highest frequency tone during the open contention interval to grant the medium to the station or to force the stations to re-contend. The control station 17 may indicate that the stations are to re-contend by changing the signal in a manner that could be understood by the stations. For example, the tone may be sent in spurts consisting of periods of the tone frequency alternating with periods of silence to indicate that the stations are to re-contend. Alternatively, the control station may broadcast the tone and follow it with a period of silence that is shorter than the open contention interval, if an open contention interval is used. The stations that broadcast the intent to transmit signal at the frequency of the tone of the control signal would sense that they have to re-contend by sensing the period of silence. Other alternatives may be appreciated by one of skill in the art.

Frequency domain processing

In the illustrative embodiments of the present invention, the contention resolution methods 58, 83 and 93 are intended for use in network systems where physical layer 26 uses a frequency modulation scheme that incorporates, discrete frequencies (e.g., Quadrature Amplitude Modulation ("QAM") frequencies). However, other network systems could also be used.

The set of frequencies used by physical layer 26 is the same set used to resolve contention between stations. Combined-contention-signal is just the simultaneous superposition of frequencies selected by contending stations during the open-contention-interval or the restricted-contention-interval. The transmission and detection processes already in place for physical layer 26 are used in the collision avoidance contention resolution methods both to transmit intent-to-transmit signals from each contending station, and to detect the resulting combined-contention-signals.

Frequency processing includes analyzing the combined-contention-signal in order to determine which frequencies are present. In the method 58 of FIGS. 3A & 3B, each contending station compares the frequency of its own intent-to-transmit signal with the highest frequency detected in the combined-contention-signal. If its own frequency is the only highest, then the station may transmit data. Otherwise, the station waits for one dead time of silence following the end of the transmission of the station that gained access to communication medium 28.

The actual detection and analysis, and the number of possible frequencies depend upon the specific physical layer used. If FFTs are used, the frequencies are chosen to be the Fourier frequencies corresponding to a sampling rate fs. In this scenario, the highest available frequency would be fs/2, and the sampling interval would be Ts=1/fs. If the number of samples per detection cycle is N, then there are N/2 distinct Fourier frequencies from fs/N to fs/2 inclusive. The detection cycle then has a duration N×Ts, which is the minimum length of open-contention-interval. For example, with 128 samples and Ts=4 micro-seconds, the detection cycle would be about 0.5 milliseconds. This would accommodate 64 frequencies, evenly spaced from roughly 2 kHz to 125 kHz.

A random number interval to assign a frequency would include the numbers 1 to 64 for selecting all of the 64 frequencies in this interval. The actual number of frequencies that can be supported is a tradeoff between the desired length of the contention interval, the maximum sampling rate, and the signal-to-noise ratio of the communication medium. However, the present invention is not limited to FFTs and other detection and analysis techniques could also be used.

Multiple priorities scheme

Figure 5:
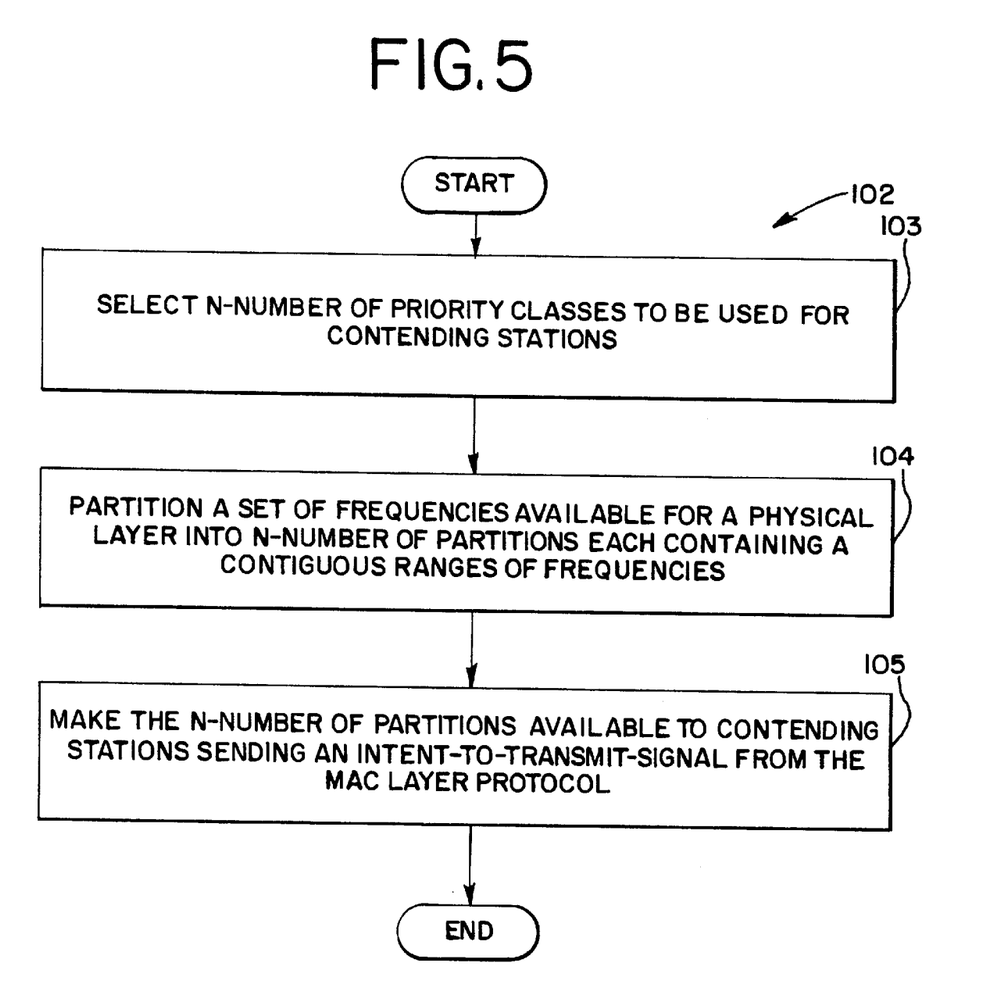
FIG. 5 is a flow diagram illustrating a method for creating multiple priorities in the complete collision avoidance contention resolution method of FIG. 2.

Multiple priority classes among the contending stations is accomplished by partitioning a set of frequencies available for physical layer 26. FIG. 5 is a flow diagram illustrating a method 102 for creating multiple priorities for use in the contention resolution scheme in FIGS. 3A & 3B and 4A & 4B. At step 103, N-number of priority classes to be used are selected. At step 104, the set of frequencies available for physical layer 26 is partitioned into N-number of partitions each containing a contiguous range of frequencies. At step 105, the N-number of partitions are provided to the stations for use in intent-to-transmit signal.

The number of priority classes must not exceed the number of available frequencies, and each priority class must include at least two frequencies. Except for these restrictions, each priority class is not required to include the same number of frequencies.

Each partition contains a contiguous range of frequencies from the set of frequencies, and the concatenation of all partitions gives the complete set. The number of priority classes corresponds directly to the number of partitions. During any given contention interval, contending stations will make their frequency selection from an assigned partition. Access to communication medium 28 is guaranteed to be granted only to one of the contending stations from the partition with the highest frequency during that particular contention interval. The mix of priority classes during each open-contention-interval does not necessarily represent one frequency from each of the total number of partitions, but one priority class is guaranteed to be the highest frequency of those that are present.

Multiple priorities are obtained by modifying steps 62 of method 58 and step 85 of collision avoiding method 83. The available frequencies are restricted to partitions that correspond to priority classes for a selected station.

Figure 6:
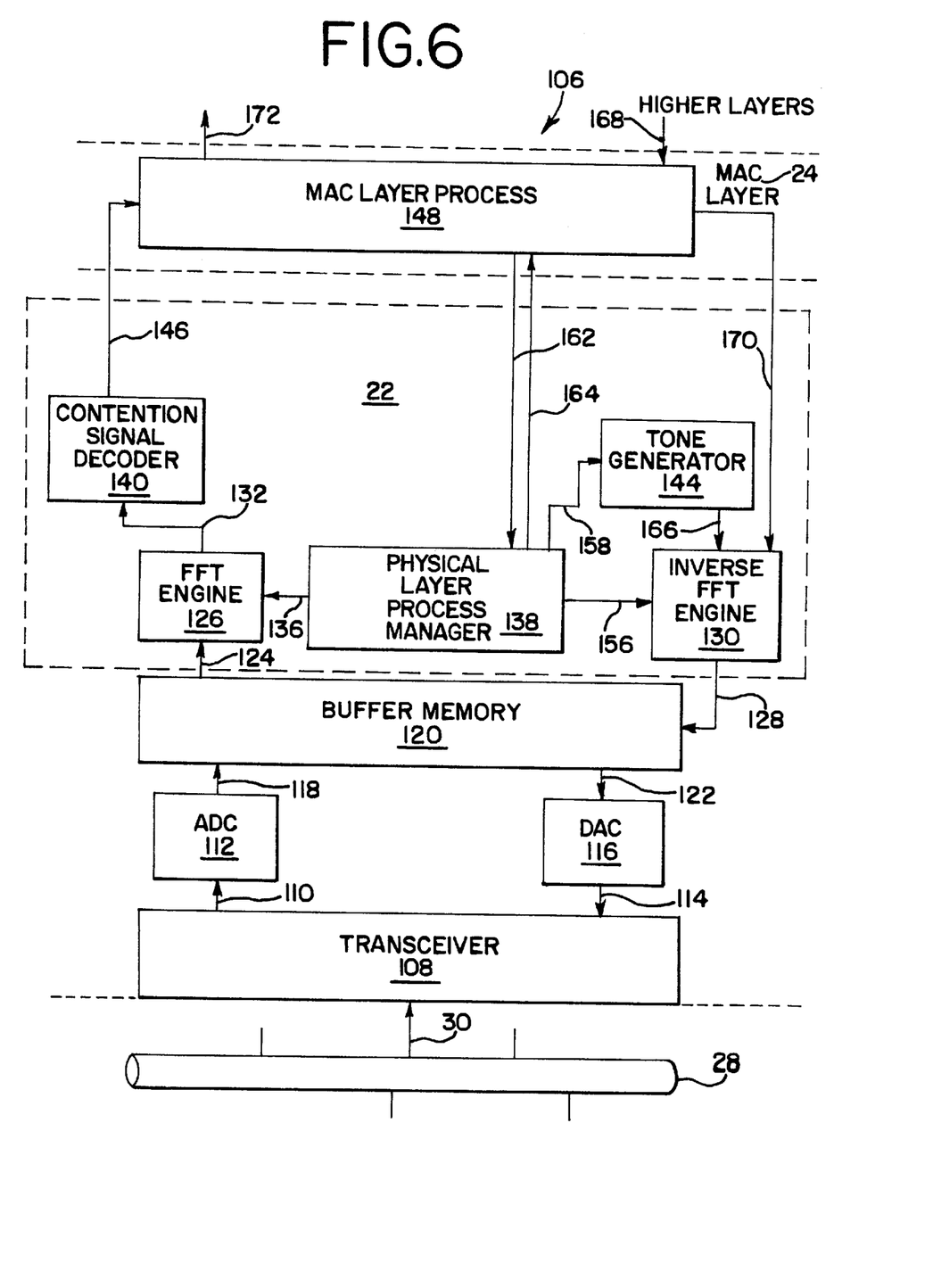
FIG. 6 is a block diagram illustrating system architecture for an illustrative embodiment of the present invention.

System Architecture for network having complete collision avoidance contention resolution FIG. 6 is a block diagram illustrating system architecture 106 for using one or more of methods 48 and 58. Communication medium 28 is a shared physical communication medium (e.g., a coaxial cable, twisted pair, etc.). Connection 30 connects shared communication medium 28 to a transceiver 108. Connection 30 is a data path for both input data from shared communication medium 28 and output data to shared communication medium 28. This is a physical connection between shared communication medium 28 and a transceiver 108. In another embodiment of the present invention, connection 30 is two distinct physical connections, one for each direction.

Transceiver 108 is hardware that transmits and receives data to/from shared communication medium 28. In another embodiment of the present invention transmit and receive functions may be carried out by two distinct hardware components, one for each direction.

Connection 110 connects transceiver 108 to an Analog-to-Digital Converter ("ADC") 112. ADC 112 converts analog input signals into digital data. Connection 114 connects transceiver 108 to a Digital-to-Analog Converter ("DAC") 116. Connection 118 connects ADC 112 to a buffer memory 120. Buffer memory 120 is used to store data being processed for either input or output. Connection 122 connects buffer memory 120 to DAC 116.

Connections 124 and 128 connect buffer memory 120 to the contention signal analyzer 22. In the contention signal analyzer 22, an FFT engine 126 receives data over connection 124 from buffer memory 120. FFT engine 126 transforms time domain signals to the frequency domain. Connection 128 connects an inverse FFT engine 130 to buffer memory 120. Inverse FFT engine 130 transforms frequency based signals to the time domain.

Digitized output of ADC 112 stored in buffer memory 120 represents a time series signal (i.e., a sequence of numbers indexed by time-of-arrival at transceiver 108). Such a time series has a corresponding representation in frequencies given by a series of numbers indexed by frequency value. The conversion of the time series representation to the frequency representation is carried out by FFT engine 126. Output of FFT engine 126 is passed along either connection 132 or connection 134 depending upon a control signal passed via connection 136 supplied by a physical layer process manager 138.

If the station is participating in contention resolution, the output of FFT engine 126 is passed to a contention signal decoder 140 over connection 132. This determination is made according to a control signal via connection 136 supplied by physical process manager 138.

Contention signal decoder 140 compares a frequency content of a signal with a frequency content of a intent-to-transmit signal that was generated by a tone generator 144. The output of contention signal decoder 140 is a logical determination of whether or not the station's frequency was the highest frequency in a combined-contention-signal. The output of contention signal decoder 140 is passed along connection 146 to a MAC layer process 148 in MAC controller 24. All of the components described above except MAC layer process 148 are in physical layer 26. MAC layer process 148 is in a MAC controller 24 of data link layer 18. The divisions between the various layers are indicated with the dashed lines in FIG. 6.

Physical layer process manager 138 is a control process that maintains states of physical layer 26. The various physical layer states are maintained as follows:

1. Inform FFT engine 126 whether it is processing an actual data transmission signal or a contention signal. It communicates via connection 136.
2. Inform inverse FFT engine 130 whether it is processing an actual data transmission signal or a contention signal. It communicates via connection 156.
3. Inform tone generator 144 to generate a tone via connection 158.
4. Receive control signals from MAC layer process 148 via connection 162.
5. Send control signals to MAC layer process 148 via connection 164.

However, more or fewer physical layer states could also be used and maintained.

Tone generator 144 provides the appropriate input to inverse FFT engine 130 to generate a single-frequency tone. The required input is supplied along connection 166.

MAC layer process 148 implements the contention resolution method 58. Data supplied by higher layers (e.g., LLC 22) are passed via connection 168 to inverse FFT engine 130 via connection 170. Data received in MAC layer process 148 from shared communication medium 28 via physical layer 26 are passed to higher layers via connection 172.

Control signals passed from MAC layer process 148 to physical layer process manager 138 via connection 162 include the following:

1. Ready for contention.
2. Start silence timer.
3. Intent-to-transmit frequency values.
4. Transmit data.

However, more or fewer control signals could also be used.

Control signals passed to MAC layer process 148 from physical layer process manager 138 via connection 164 include the following:

1. Silence timer expired.
2. Transmission complete.

However, more or fewer control signals can also be used. In addition, the result of a frequency comparison completed by contention signal decoder 140 is passed to MAC layer process 148 via connection 146 to determine whether or not the station has gained access to shared medium 28.

The present invention is not limited to architecture 106 and more or fewer components could also be used. In an illustrative embodiment of the present invention, the complete collision avoidance contention resolution methods are simple, efficient and can be used on a variety of computer network types. One or more of methods 48, 58, 83 and 93, or 102 allow for fast contention resolution for a large number of network stations with differing priority class levels and delay requirements.

It should be understood that the programs, processes, methods and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. In addition, although the station with the only highest frequency intent to transmit signal is granted access to the medium 28, any standard of comparison may be used. For example, the station having the only lowest frequency intent to transmit signal may be the one granted access to the medium.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

We claim:

1. A system for resolving contention for access to a shared communication medium in a computer network of a plurality of stations, the system comprising, in combination:
   a contention signal transmitter in a first and second station for broadcasting an intent-to-transmit signal of a frequency, the intent-to-transmit signal from said first and second stations combining in the communications medium to create a combined contention signal;
   a contention signal analyzer for decoding the combined contention signal, the contention signal analyzer operative to compare the frequencies of the intent-to-transmit signals and to determine whether one of the stations broadcast the intent-to-transmit signal with an endmost frequency; and
   a medium access controller in at least one station to enable the station with the only endmost frequency intent-to-transmit signal to transmit data on the communications medium, and to initiate a restricted contention for access between the stations having intent-to-transmit signals with the same endmost frequency whereby, access to the communication medium is resolved without a collision of data between any two stations.

2. The system of claim 1 wherein the contention signal analyzer determines the endmost frequency by identifying the highest frequency intent to transmit signal.

3. The system of claim 1 wherein the contention signal analyzer determines the endmost frequency by identifying the lowest frequency intent to transmit signal.

4. The system of claim 1 further comprising a control station having said contention signal analyzer and said medium access controller, said control station further comprising a control signal transmitter for transmitting (1) a first control signal to enable the station that broadcast the only endmost frequency to transmit data, and (2) a second control signal to force the stations that broadcast the same endmost frequency to re-contend for access.

5. The system of claim 1 wherein each station includes a unique network address, and wherein the system further comprises a control station having the contention signal analyzer and the medium access controller, the control station further comprising a message transmitter for transmitting (1) a grant message to the station having the only highest frequency intent-to-transmit signal, (2) a contend message to the stations having the same highest frequency intent to-transmit signals and (3) a wait message to the stations that do not have the highest frequency intent-to-transmit signal.

6. The system of claim 1 wherein the contention signal transmitter, the contention signal analyzer and the medium access controller operate in any of the plurality of stations on the network having a data transmit capability.

7. The system of claim 1 wherein said first and second stations operate in accordance with a medium access control protocol, said protocol comprising:

an open-contention-interval initiated by a dead-time-silence-interval for permitting said first and second stations to contend for access to the medium;

an intent-to-transmit signal generated by said first and second stations have data to transmit;

said intent-to-transmit signals of said first and second stations having data to transmit combined into a combined-contention-signal; and a restricted-contention-interval initiated by a restricted-contention-delay-interval for permitting when said first and second stations broadcast the intent-to-transmit signals with the same highest frequencies to contend for access to the medium.

8. The system of claim 7 wherein the intent-to-transmit signal comprises:

a randomly selected signal frequency from a set of signal frequencies used for a physical layer;

wherein the combined-contention-signal is superposition of a plurality of intent-to-transmit signals from the stations in the computer network that have data to transmit.

9. The system of claim 1 wherein the combined-contention-signal is a superposition of a plurality of intent-to-transmit signals from a plurality of stations in the computer network.

10. The system of claim 1 wherein the contention signal analyzer further comprises:

a Fast Fourier Transform engine, for converting a time domain signal into a frequency domain signal;

an inverse Fast Fourier Transform engine, for converting a frequency domain signal into a time domain signal; and a physical layer process manager, for maintaining a physical layer below the medium access control layer.

11. In a network of a plurality of stations contending for access to a shared communications medium, a method for resolving contention among said stations comprising the steps of:

broadcasting a first signal on the communications medium from stations having data to transmit, the first signal having an access parameter;

receiving a second signal at stations on the network, the second signal being a combination of first signals of the stations on the network having data to transmit; and at least one of the stations analyzing the second signal by the steps of:

determining whether the access parameter of the first signal of each station includes the only highest access parameter; and when one of the stations has the only highest access parameter, enabling the station to transmit data on the communications medium; and repeating the method until one station broadcasts the only highest access parameter first signal such that contention is resolved without any collision of data on the communication medium.

12. A computer readable medium having stored therein instructions for causing a central processing unit on at least one of the stations to execute the step of analyzing the second signal in the method of claim 11.

13. A computer readable medium having stored therein instructions for causing a central processing unit on at least one of the stations to execute the steps broadcasting said first signal and receiving said second signal in the method of claim 11.

14. The method of claim 11 wherein the second signal includes a plurality of signal frequency partitions allowing a plurality of priority classes to be used to select a station to transmit data to the communication medium.

15. The method of claim 11 wherein the determining step includes using fast Fourier transformations to decode the plurality of frequencies in the second signal.

16. The method of claim 11 further comprising the steps of:

when one of the stations has data to transmit, repeatedly checking for a silent communications medium; and waiting for the communications medium to remain silent for a first silence time interval.

17. The method of claim 11 wherein a randomly selected frequency determines the access parameter of the first signal, the method further comprising the steps of:

each station determining whether the station randomly selected the highest frequency first signal in the second signal, and if not, waiting for an open-contention-interval before sending another randomly selected frequency first signal.

18. The method of claim 17 wherein the second signal includes a plurality of signal frequency partitions allowing a plurality of priority classes to be used to select a station to transmit data to the communication medium.

19. The method of claim 17 wherein the determining step includes using Fast Fourier Transformations to decode frequencies in the second signal.

20. The method of claim 11 wherein the network includes an access control station wherein:

the step of determining whether the access parameter of the first signal of each station includes the only highest access parameter comprises the step of the access control station comparing the first signals from the stations having data to transmit; and the step of enabling the station having the highest access parameter first signal to transmit data comprises the step of the access control station sending an enable message to the station having the only highest access parameter first signal.

21. In a station on a network having a plurality of stations contending for access to a shared communications medium, a method comprising the steps of:

repeatedly checking for a silent communications medium;

waiting for the communications medium to remain silent for a first silence time interval;

broadcasting a first signal on the communications medium, the first signal having an access parameter;

receiving a combination of all first signals of all stations on the network having data to transmit, the combination forming a second signal;

analyzing the second signal to determine if the access parameter of the first signal of the station is the only highest, one of the highest or not the highest access parameter of the first signals in the combination of signals;

when the access parameter is the only highest, transmitting the data on the communications medium;

when the access parameter is one of the highest, waiting with the other stations having the highest access parameter for the communications medium to remain silent for a second silence interval of time, shorter than the first silence interval of time and repeating the method from the step of broadcasting the first signal; and when the access parameter is not the highest, repeating the method from the step of repeatedly checking for the silent communications medium.

22. A computer readable medium having stored therein instructions for causing a central processing unit on a station to execute the method of claim 21.

23. The method of claim 21 wherein the second signal includes a plurality of signal frequency partitions allowing a plurality of priority classes to be used to select a station to transmit data to the communication medium.

24. The method of claim 21 wherein the determining step includes using fast Fourier transformations to decode the plurality of frequencies in the second signal.

25. The method of claim 21 wherein a randomly selected frequency determines the access parameter of the first signal, the method further comprising the steps of:

each station determining whether the station randomly selected the highest first signal frequency in the second signal, and if not, waiting for an open-contention-interval before sending another randomly selected frequency first signal.

26. The method of claim 25 wherein the second signal includes a plurality of signal frequency partitions allowing a plurality of priority classes to be used to select a station to transmit data to the communication medium.

27. The method of claim 25 wherein the determining step includes using Fast Fourier Transformations to decode frequencies in the second signal.

28. A computer readable storage system for a network station having stored therein a set of routines for implementing a medium access control protocol for contention resolution and capable of distinguishing among a plurality of priority classes for a plurality of said network stations connected to a computer network, said set of routines implementing said protocol including a set of intervals and signals comprising:

an open contention interval initiated by a dead-time-silence interval, the open contention interval used to allow the plurality of stations to contend to gain control of a communications medium;

an intent-to-transmit signal, comprising an access parameter for measuring whether the station has access to the communications medium in relation to other stations that broadcast the intent-to-transmit signal;

a combined contention signal comprising a combination of the intent-to-transmit signals, the combined contention signal being used by each station to resolve contentions such that one of the plurality of stations transmits data on the communications medium when it transmits the only highest parameter intent-to-transmit signal; and a restricted contention interval for resolving contention only between a plurality of stations having the highest access parameter, the restricted contention interval being initiated by a restricted contention interval delay.

29. The computer readable medium of claim 28, wherein the set of signal frequencies available on the physical layer is partitioned into a plurality of contiguous frequency ranges and a class priority is associated with the plurality of partitions, and the partitions are used to provide a plurality of priority classes for the plurality of stations contending to gain control of the physical layer below the medium access control layer.

30. In a network of a plurality of stations operable to transmit data on a shared communications medium, an apparatus in a first station for resolving contention among the plurality of stations for access to the shared communication medium, said apparatus comprising:

a transceiver for transmitting a first signal when said first station has data to transmit, and for receiving a second signal when said first signal combines with at least a second intent to transmit signal transmitted by at least a second station;

a contention signal analyzer comprising an FFT engine for analyzing a plurality of frequencies in said second signal, a tone generator for randomly selecting a tone for generating said first signal, an inverse FFT engine for translating said tone for broadcasting on the communications medium, and a contention signal decoder for determining the frequencies in the second signal; and a medium access controller for setting an open contention interval for transmission of the first signal, for determining if the first signal has the only endmost frequency from the frequencies determined by the contention signal decoder, for setting a restricted contention interval when the first signal is one of the endmost frequencies and for transmitting data when the first signal has the only endmost frequency such that the station obtains access to the medium without the possibility of colliding with data from another station.

* * * * *